United States Patent
Zhao et al.

(10) Patent No.: US 6,870,711 B1
(45) Date of Patent: Mar. 22, 2005

(54) DOUBLE LAYER SPACER FOR ANTIPARALLEL PINNED LAYER IN CIP/CPP GMR AND MTJ DEVICES

(75) Inventors: Tong Zhao, Milpitas, CA (US); Hui-Chuan Wang, Pleasanton, CA (US); Yun-Fei Li, Fremont, CA (US); Chyu-Jiuh Torng, Pleasanton, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 10/863,406

(22) Filed: Jun. 8, 2004

(51) Int. Cl.$^7$ ............................. G11B 5/39; G11B 5/127
(52) U.S. Cl. ................ 360/313; 360/324.1; 428/694 T; 428/694 TS; 428/694 TM; 29/603.14
(58) Field of Search ............... 360/313, 324–324.12; 428/689, 692–694 R, 694 T, 694 TS, 694 TM; 365/171–173; 29/603.13, 603.14

(56) References Cited

U.S. PATENT DOCUMENTS

| | | | |
|---|---|---|---|
| 5,465,185 A | 11/1995 | Heim et al. | 360/113 |
| 5,701,223 A | 12/1997 | Fontana, Jr. et al. | 360/113 |
| 5,841,692 A | 11/1998 | Gallagher et al. | 365/173 |
| 6,153,320 A | 11/2000 | Parkin | 428/693 |
| 6,612,018 B1 | 9/2003 | Gill | 29/603.14 |
| 6,620,530 B1 | 9/2003 | Li et al. | 428/692 |
| 6,667,901 B1 | 12/2003 | Perner et al. | 365/173 |
| 6,731,477 B2 * | 5/2004 | Lin et al. | 360/324.1 |

OTHER PUBLICATIONS

"Oscillations in Exchange Coupling and Magneto—resistance in Metallic Superlattice Structures; Co/Ru, Co/Cr, and Fe/Cr," Phys. Rev. Lett., vol. 64, No. 19, May 7, 1990, pp. 2304–2308.

* cited by examiner

*Primary Examiner*—Ramon M. Barrera
(74) *Attorney, Agent, or Firm*—George D. Saile; Stephen B. Ackerman

(57) ABSTRACT

A pinned/pinning layer configuration of the form: AP1/coupling bilayer/AP2/AFM, suitable for use in a CIP or CPP GMR sensor, a TMR sensor or an MRAM element, is found to have improved magnetic stability, yield good values of dR/R and have high values of saturation magnetization that can be adjusted to meet the requirements of magnetic field annealing. The coupling bilayer is a layer of Ru/Rh or their alloys, which provides a wide range of coupling strengths by varying either the thickness of the Ru layer or the Rh layer.

10 Claims, 1 Drawing Sheet

DOUBLE LAYER SPACER FOR ANTIPARALLEL PINNED LAYER IN CIP/CPP GMR AND MTJ DEVICES

BACKGROUND OF THE INVENTION

1. Field of the Invention

This invention relates generally to all GMR devices having synthetic, antiparallel coupled pinned layers and, more particularly, to a novel coupling layer that provides greater stability for the coupling.

2. Description of the Related Art

The GMR (giant magneto-resistive) sensor and its operation are easy to describe conceptually, although the technological developments that have led to its present form are quite complex. Basically the GMR sensor consists of two magnetic layers, formed vertically above each other in a parallel planar configuration and separated by a non-magnetic layer. Each magnetic layer has a magnetic moment in the plane of the layer. When a "sense" current passes between the planes it is subject to resistance variations, dR, which are proportional to the angle between the magnetization directions. These variations are measured by voltage variations between the ends of the sensor. The quality of the sensor is measured by what is called the GMR ratio, dR/R, which is the ratio between the maximum resistance variation and the resistance of the sensor.

The evolution of the general GMR configuration, has created a form, called a spin-valve, which includes one layer whose magnetic moment is free to move under the influence of external fields (the "free" layer) and another layer whose magnetic moment is fixed in space (the magnetically "pinned" layer or "reference" layer). These two layers are separated by a non-magnetic layer. This form is presently used in a wide variety of devices and in several basic configurations. In current-in-plane (CIP) configurations, a sense current passes longitudinally along the plane directions of the layers, entering at one lateral edge of the sensor and exiting at the other. In current-perpendicular-to-plane (CPP) configurations, the current passes vertically through the planes, entering at the top and exiting through the bottom. In the tunneling magnetoresistive configuration (TMR), which can be used as a sensor and is now also used in MRAM devices, the free and pinned layers are separated by a dielectric tunneling layer and the angle between the magnetic moments does not directly create a resistance variation but rather determines a quantum mechanical tunneling probability through the barrier layer. In the GMR spin valve read head devices, the free and pinned layers are separated by non-magnetic conducting layers. In all of these devices, however, the pinned layer shares a common role and a common configuration: two layers of ferromagnetic material (called AP1 and AP2) separated by a non-magnetic but electrically conducting coupling (or spacer) layer, with the entire tri-layered structure held magnetically in place by an antiferromagnetic (AFM) pinning layer in the following configuration: AP1/coupling layer/AP2/AFM More specifically, the antiferromagnetic pinning layer pins one ferromagnetic layer (AP2) in a unidirectional magnetization direction. This unidirectionally pinned layer then couples across the coupling layer with the other ferromagnetic layer (AP1), causing its magnetization to be held in an antiparallel direction to AP2. The process by which the magnetizations are set is an annealing process wherein the configuration is subjected to an external magnetic field at specific temperatures for a certain length of time. Typically, the material composition and thicknesses of AP1 and AP2 are chosen so that the total magnetic moment of the tri-layer is approximately zero. This important method of forming the pinned layer using an approximately zero net magnetic moment tri-layered configuration is disclosed in Heim et al. (U.S. Pat. No. 5,465,185) and later expanded upon in Fontana, Jr., et al. (U.S. Pat. No. 5,701,223), both of which use a Ru layer as the antiferromagnetic coupling layer. Somewhat later Parkin (U.S. Pat. No. 6,153,320) discloses an antiferromagnetically coupled trilayer in which the coupling layer is a ternary alloy of Ru, Os and Re. Gill (U.S. Pat. No. 6,612,018) also discloses a trilayer using a Ru coupling layer, but the ferromagnetic layers coupled thereby are specifically composed of $Co_{90}Fe_{10}$. Li et al. (U.S. Pat. No. 6,620,530) discloses a trilayer pinned layer in which the coupling layer is a layer of Ru, Ir or Rh which is formed to a thickness of only 4 angstroms. Ordinarily such a thin coupling layer would require very high annealing fields, but the disclosed invention requires lower fields. Finally, Perner et al., (U.S. Pat. No. 6,667,901) discloses a device in which a first magnetic tunnel junction is formed directly on a second magnetic tunnel junction, both junctions including pinned trilayers. As will be discussed below, the present invention teaches a pinned trilayer having performance features that are not found in the prior art cited above.

Because the role of the pinned layer is to retain a spatially fixed set of magnetization directions and to thereby serve as a reference layer for the free layer's moving magnetic moment, it must be coupled in a manner that produces a stable direction of magnetization.

For a GMR sensor with such a pinned layer there are, in fact, three basic requirements:

(1) High dR and dR/R for a high signal.

(2) High $H_s$, saturation field of the antiparallel coupled pinned layer, for good directional stability.

(3) Correct AP1/AP2 thickness and thickness ratio, for directional stability and a good value of dR/R.

Although a high $H_s$ is desirable, there is a conflict between too high a value and the limitations of the annealing process required to set the pinned layer field direction. As is well known in the art, a high field magnetic annealing is usually required to establish a well defined pinned direction in the antiparallel pinned structure. During the annealing process a magnetic field is applied at a 150°–350° C. temperature to align the magnetic moments of AP1 and AP2 in a parallel direction. This requires overcoming $H_s$ so that the magnetic moments can be forced into the parallel alignment. Since the maximum available magnetic field in commercially available heating ovens is typically between 10 and 20 kOe, this means that Hs cannot be too great.

It is usually desirable to adjust the thicknesses of the AP1 and AP2 layers for the purpose of optimizing the GMR performance in the CIP or CPP sensor or the TMR performance in a tunneling junction configuration. For example, the dR/R ratio in a CIP configuration reaches a peak value at certain AP1 thicknesses. In the TMR and CPP GMR configurations, dR/R keeps increasing with the AP1 thickness because the spin diffusion length is longer in those configurations. As is known, $H_s$ is a function of exchange coupling and AP1 (AP2) thickness. Hs will decrease with increasing AP1 thickness. To maintain Hs and other stability related properties which are dependent on AP1 thickness and meanwhile meet the requirements set by magnetic annealing capabilities, the coupling strength between the AP1 and AP2 layers should be adjustable within a wide range. The coupling strength, however, depends strongly on the material used for the spacer layer. For example, Ru and Rh are most often used as coupling layer materials. The peak value of the coupling strength obtained with Rh is nearly five times that obtained with Ru. Thus, by using Rh instead of Ru a much stronger coupling between AP1 and AP2 is obtained, but, conversely, magnetic annealing becomes nearly impossible. Thus, for practical purposes, coupling strengths between those provided by Ru and those provided by Rh are needed. For this reason, the present invention proposes a Rh/Ru or Ru/Rh double layer as the coupling layer. With such a double layer a wide range of coupling strengths can be obtained and the advantages of stability and ease of annealing can both be had.

SUMMARY OF THE INVENTION

A first object of this invention is to provide a method of forming a stable pinned layer for a CIP or CPP GMR sensor, a TMR sensor or an MRAM element, wherein the pinned layer has two ferromagnetic layers coupled by a coupling layer in an antiparallel configuration and pinned in that configuration by an antiferromagnetic pinning layer.

A second object of this invention is to provide such a pinned layer wherein the requirements of a strong saturation field, $H_s$, and the limitations set by fields obtainable in annealing processes can both be met.

A third object of this invention is to provide such a pinned layer which offers both a high value of $H_s$ and a high value of dR/R, both of which contribute to the desired stability of the layer and the performance of the sensor.

A fourth object of this invention is to provide such a pinned layer wherein the coupling layer provides a wide range of coupling strengths between the magnetizations of the ferromagnetic layers.

A fifth object of the invention is to provide a coupling layer meeting the objects of the invention which does not shunt too much current when used in CIP geometry.

These objects will be met by coupling AP1 and AP2 across a novel coupling layer that is a bilayer of Ru/Rh or Rh/Ru, wherein Ru and Rh separately provide coupling strengths which are relatively weak and relatively too strong respectively. Furthermore, the resistance of the bilayered combination is greater than that of a layer of Rh alone because the resistivity of Rh is lower than that of Ru. The bilayer gives us two adjustable parameters, the thickness of the Ru portion and the thickness of the Rh portion, which can be adjusted to provide both good stability and dR/R.

DESCRIPTION OF THE PREFERRED EMBODIMENTS

Figure 1:
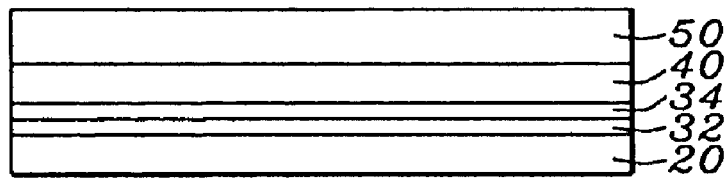
FIG. 1 is a schematic cross-sectional view of a pinned/pinning layer configuration of the form AP1/coupling layer/AP2/AFM.

The preferred embodiment of the present invention is a pinned/pinning layer structure of the form:

AP1/coupling layer/AP2/AFM wherein the coupling layer is a novel bilayer of Ru/Rh or Rh/Ru. The bilayer combination provides two adjustable parameters, the thicknesses of the Rh and Ru layers, by whose adjustment a wide range of coupling strengths can be obtained. This structure can be incorporated into a wide range of devices that use the GMR effect, including GMR sensors of the CIP and CPP configuration and TMR devices such as MRAM elements. Each of these devices will be improved in their performance characteristics, as measured by such parameters as dR/R, by the inclusion of a pinned/pinning layer structure of improved stability.

Referring now to FIG. 1, there is shown the structure of the present invention as it would appear when incorporated into a sensor or an MRAM cell. Layer AP1 (20) is a layer of ferromagnetic material such as CoFe, layer AP2 (40) is a second layer of ferromagnetic material such as CoFe or other alloys of Co, Fe, Ni, the coupling bilayer of the present invention (30) that promotes the antiparallel configuration of the magnetic moments of AP1 and AP2 is formed between AP1 and AP2. The coupling layer is a bilayer of Ru (32), formed to a thickness between approximately 0.5 and 20 angstroms and Rh (34), also formed to a thickness between 0.5 and 20 angstroms. The bilayer can also be formed of one layer of Ru and/or its alloys and one layer of Rh and/or its alloys. An antiferromagnetic pinning layer (50) is formed on AP2. The pinning layer, which pins the magnetization of AP2 unidirectionally, is a layer of antiferromagnetic material such as MnPt or IrMn, formed to a thickness between 50 and 300 angstroms, depending on the material. The annealing process to set the pinning direction and to minimize magnetic dispersion requires an external magnetic field between approximately 5000 and 20000 Oe, at a temperature between approximately 150° C. and 300° C. to set the magnetizations of AP1 and AP1 in a parallel direction, followed by a cooling down to room temperature so that the coupling layer can promote the final antiparallel coupled configuration.

Experiments have been conducted on specific configurations of this structure in which the thickness of the coupling layer has been varied by separately varying the thickness of the Ru and Rh portions and the resulting saturation field, $H_s$ has been measured. In the first set of measurements (table immediately below) the structural form was:

Ta 50/CoFe 20/Ru 3/Rh x/CoFe 20/Ta 50.

Here, the structure is placed between capping layers of 50 angstrom thick Ta. The Ru layer of the coupling layer is fixed at 3 angstroms and the Rh layer thickness is varied over three thickness values: x=3 angstroms, x=3.5 angstroms and x=4 angstroms. The corresponding values of $H_s$ (in Oe) are shown in Table 1:

TABLE 1

| x (angstroms) | 3 | 3.5 | 4 |
|---|---|---|---|
| $H_s$ (Oe) | 17,500 | 12,500 | 7,500 |

A second set of measurements (Table 2) were applied to the same configuration, but now the positions of the Rh and Ru were interchanged and the thickness of the Ru layer was varied, producing the following structure:

Ta 50/CoFe 20/Rh 3/Ru x/CoFe 20/Ta 50.

TABLE 2

| x (angstroms) | 3 | 3.5 | 4 |
|---|---|---|---|
| $H_s$ (Oe) | 25,000 | 12,500 | 5,000 |

The same structure, but using single layers of Ru or Rh alone, produced peak values of $H_s$ of 37,500 Oe with the Rh spacer and 8,500 Oe with the Ru spacer. Thus, the experimental results shown in the tables above indicate that a much wider range of saturation field can be obtained by the coupling bilayer than by use of a single layer. As already indicated, the 8,500 Oe maximum Hs obtained with Ru only allows proper annealing, but the stability of the structure is less than optimum because of the weak saturation field. On the other hand, the Rh layer only provides a strong saturation field, but it exceeds the capabilities of the annealing process. Therefore, by adding only one additional layer to the coupling layer, which does not significantly affect the fabrication process, a much better control over stability and performance is obtained.

It is to be noted that although a Rh/Ru configuration and a Ru/Rh configuration, in isolation, have similar adjustable coupling strengths, the materials of the layers that are immediately adjacent to them will influence the choice of configuration. Thus, the Rh/Ru configuration is preferred in a bottom spin valve with a specular scattering AP1 structure such as: AFM/AP2/Rh/Ru/CoFeOx (AP1 being CoFeOx), because the Ru is more resistant to oxidation which could degrade the AP1-to-AP2 coupling.

It is also to be noted that Ru can be replaced by its alloys as can Rh, so the bilayer can be of the form (Ru and/or its alloys)/(Rh and/or its alloys).

As is understood by a person skilled in the art, the preferred embodiments of the present invention are illustrative of the present invention rather than limiting of the present invention. Revisions and modifications may be made to methods, materials, structures and dimensions employed in forming and providing a stable pinned/pinning layer structure incorporating a coupling bilayer, while still forming and providing such a device and its method of formation in accord with the spirit and scope of the present invention as defined by the appended claims.

What is claimed is:

1. An antiferromagnetically coupled pinned layer structure with a coupling bilayer for adjustable coupling strength, comprising:

a first ferromagnetic layer, AP1;

a coupling bilayer formed on AP1;

a second ferromagnetic layer, AP2, formed on the bilayer;

an antiferromagnetic pinning layer formed on AP2, wherein the magnetic moments of AP1 and AP2 are coupled in a directionally stable antiparallel configuration across the coupling bilayer and the magnetic moment of AP2 is unidirectionally pinned by the antiferromagnetic pinning layer.

2. The structure of claim 1 wherein the coupling bilayer is formed of a first layer comprising any combination of Ru and/or its alloys and formed to a first thickness, and a second layer, formed to a second thickness on said first layer, said second layer comprising any combination of Rh and/or its alloys, but where the material composition of AP1 and AP2 may make the interchange of the positions of said first and second layers more advantageous.

3. The structure of claim 1 wherein the coupling bilayer is a layer of Rh formed to a thickness between approximately 0.5 and 20 angstroms, formed on a layer of Ru, which is formed to a thickness between approximately 0.5 and 20 angstroms.

4. The structure of claim 1 wherein AP1 and AP2 are formed of ferromagnetic materials that are alloys of Co, Fe and Ni.

5. The structure of claim 1 used as a highly stable pinned layer in a GMR sensor of CPP or CIP geometry.

6. The structure of claim 1 used as a highly stable pinned layer in a TMR sensor or MRAM element.

7. A method for forming an antiferromagnetically coupled pinned layer structure with a coupling bilayer for adjustable coupling strength, comprising:

forming a first ferromagnetic layer, AP1;

forming a coupling bilayer on AP1, by depositing a first coupling layer of a first coupling material to a first thickness and then depositing a second coupling layer of a second coupling material to a second thickness on said first coupling layer;

forming a second ferromagnetic layer, AP2, on the bilayer;

forming an antiferromagnetic pinning layer on AP2;

annealing the layers in a magnetic field that is sufficient to overcome the saturation field provided by said coupling bilayer, whereby the magnetic moments of AP1 and AP2 are coupled in a magnetically stable antiparallel configuration across the coupling bilayer and the magnetic moment of AP2 is unidirectionally pinned by the antiferromagnetic pinning layer.

8. The method of claim 7 wherein the coupling bilayer is a formed of a first layer comprising any combination of Ru and/or its alloys and formed to a first thickness, and a second layer, formed to a second thickness on said first layer, said second layer comprising any combination of Rh and/or its alloys, but where the material composition of AP1 and AP2 may make an interchange of the positions of said first and second layers more advantageous.

9. The method of claim 7 wherein the coupling bilayer is a layer of Rh formed to a thickness between approximately 0.5 and 20 angstroms, formed on a layer of Ru, which is formed to a thickness between approximately 0.5 and 20 angstroms.

10. The method of claim 7 wherein AP1 and AP2 are formed of ferromagnetic materials that are alloys of Co, Fe and Ni.

* * * * *